J. E. ANGER.
SUSPENSION OF RAILWAY AND TRAMWAY VEHICLE TRUCKS.
APPLICATION FILED DEC. 17, 1909.
1,008,103.
Patented Nov. 7, 1911.
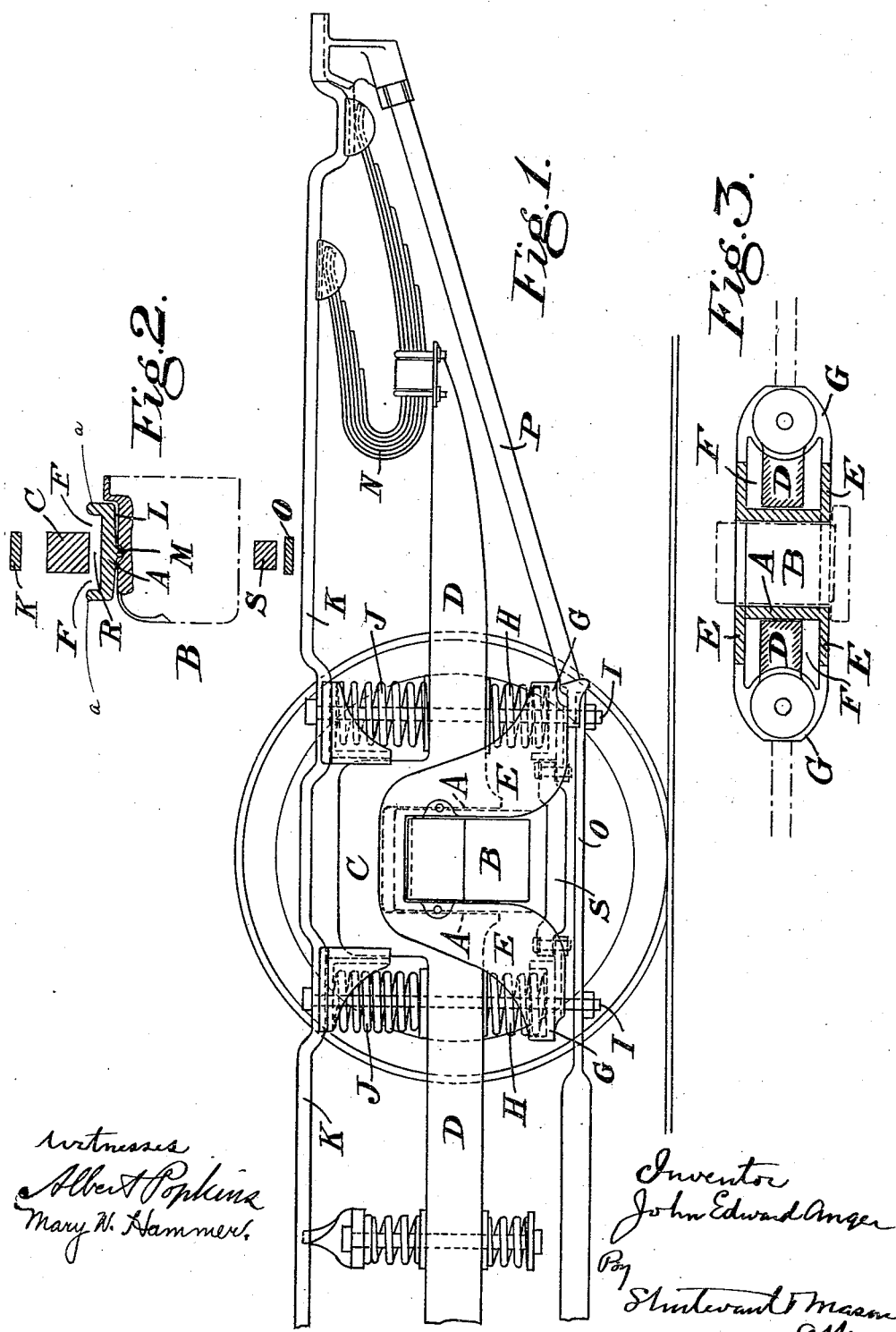

UNITED STATES PATENT OFFICE.

JOHN EDWARD ANGER, OF PRESTON, ENGLAND.

SUSPENSION OF RAILWAY AND TRAMWAY VEHICLE-TRUCKS.

1,008,103.      Specification of Letters Patent.      Patented Nov. 7, 1911.

Application filed December 17, 1909. Serial No. 533,680.

*To all whom it may concern:*

Be it known that I, JOHN EDWARD ANGER, a citizen of the United States of America, residing in Preston, in the county of Lancaster, in the Kingdom of England, have invented certain new and useful Improvements in or Relating to the Suspension of Railway and Tramway Vehicle-Trucks, of which the following is a specification.

This invention relates to certain improvements in the suspension of the trucks or under-carriages of railway and tramway vehicles.

One way of suspending the under-carriages hitherto, has been by means of coiled springs resting on stirrups cast on the axle boxes in such a way, that the axles could not move much in a lateral direction when making around curves, consequently the axles had to be comparatively close together, and if a longer wheel base was required, radial trucks turning on king pins had to be used.

By the present invention I suspend the under-carriage truck axle boxes, in such a manner that the axle can move to a certain extent in a lateral direction when going around curves, thus enabling me to provide a longer car, with the two axles farther apart than hitherto, and this without the use of radial trucks turning on king pins, or the use of radial axle boxes or any similar expedient of that kind.

In the accompanying drawings, Figure 1 is a side elevation of a part of the under frame of a car; Fig. 2, a vertical cross section through the center line of the axle box; Fig. 3, a horizontal section through the center line of the axle box.

In carrying my invention into effect, I dispense with the stirrups which in most arrangements hitherto have been cast on the axle boxes, and on which the spiral springs rest, and in place thereof I provide yokes A, one of which straddles each axle box B and fits fairly snugly between the horns C of the side members D of the under-carriage. These yokes A are made considerably wider than the side members D, and have flanges E on each side with a good clearance F between them and the side members D, say one and a half inches (more or less), so as to provide for movement or play in a lateral direction. The yoke A hangs on the axle box B, and its depending legs on each side terminate in circular or other shaped stirrups G, which form seats for spiral springs H. These are located some distance apart, so as to provide a long spring seat for overcoming oscillation. These springs are placed between the side members D of the under-carriage and the stirrups G. Guide bolts I are passed through the stirrups G and side members D, and through the springs and made fast by nuts, and this makes it impossible for any of the parts of the suspension device to become displaced. Or the bolts I can be extended upward through springs J placed between the under-frame K of the car, and the side members D of the under-carriage, while nuts at one end of the bolts serve as means for tightening all up. The yoke A at the top has flanges a, as well as being flanged at the sides E, and can have a small rocking edge L entering a slight depression M in the top of the axle box B. This rocking edge can be central, or at one side if desired to prevent a too free movement of the body.

The weight of the vehicle can be borne not only by the spiral springs H and J aforesaid, but also by laminated springs N bolted at the extreme ends of the side members D of the frame. These latter support the overhang of the body at the ends. The recesses R between the horns of the side frames and the top of the yoke A permit vertical motion. The depending legs of each yoke A are coupled together by a brace O for strengthening and spacing purposes, and a strut P connects the legs with the under frame K of the vehicle.

S is a yoke stay bolted to the stirrups.

By the construction hereinbefore described, the axle boxes B and their yokes A can move laterally and freely, when the car is going around a curve, and thus the bad effects of side thrust is avoided, which is so liable to break the flanges of the wheels, or in time cause them and the rails to rapidly wear away. Furthermore the arrangement is such, that there is a tendency of the axle boxes B to return to their proper position when on a straight track, that is, assist in centralizing the running gear of the car, when changing from a curved to a straight road. With this arrangement the usual bottom stay, and the end strut, which support the ends of the overhanging body can be retained, which is not possible with other types.

I declare that what I claim is:—

1. In a railway or tramway vehicle, in combination with the axle box and the side members of the under carriage, a yoke straddling the axle box and provided with flanges with a clearance between the same and the side members to provide for play in a lateral direction, seats on the depending legs of the yoke, and springs inserted between the said depending legs and the side members of the under carriage, whereby the carriage can move to a certain extent in an axial direction when going around curves.

2. In a railway or tramway vehicle, in combination with the axle box and the side members of the under carriage, a yoke straddling the axle box and provided with flanges with a clearance between the same and the side members to provide for play in a lateral direction, seats on the depending legs of the yoke, and springs inserted between the said depending legs and the side members of the under carriage, whereby the carriage can move to a certain extent in an axial direction when going around curves, said yoke having a rocking edge resting in a depression on the axle box.

3. In a railway or tramway vehicle, in combination with the axle box and the side members of the under carriage, said side members having horns, a yoke straddling the axle box and having flanges fitting between said horns, and having also depending legs on each side terminating in seats between the flanges, and springs interposed between the seats and the side members.

4. In a railway or tramway vehicle, in combination with the axle box, a yoke straddling the axle box and provided with flanges, side members secured to the under carriage and passing between the flanges of the yoke, and of a width less than the distance between the flanges to provide for the lateral movement, and springs between the yoke and side members on each side of the axle boxes.

5. In a railway or tramway vehicle, in combination with the axle box, a yoke straddling the axle box and having a rocking connection therewith, side members secured to the under carriage and passing between the flanges of the yoke and of a width less than the distance between the flanges to provide for the lateral movement, and springs between the yoke and side members on each side of the axle boxes.

6. In a railway or tramway vehicle, in combination with the axle box, a yoke straddling the axle box and having a rocking lower face engaging the axle box, side members secured to the under carriage and passing between the flanges of the yoke, and of a width less than the distance between the flanges to provide for the lateral movement, and springs between the yoke and side members on each side of the axle box.

7. In a railway or tramway vehicle, in combination with the axle box, a yoke straddling the axle box and rocking thereon, side members passing between the flanges of the yoke and of a width less than the distance between the flanges to provide for the lateral movement, springs connecting the ends of the side members with the under carriage, a coil spring between the lower ends of the yoke and the side members on each side of the axle box, and coil spring between the under carriage and the side members.

In witness whereof, I have hereunto signed my name this 8th day of December, 1909, in the presence of two subscribing witnesses.

JOHN EDWARD ANGER.

Witnesses:
G. C. DYMOND,
R. W. WILLIAMS.